Patented Mar. 2, 1954

2,671,074

UNITED STATES PATENT OFFICE 2,671,074

INTERPOLYMER, ELASTIC PRODUCT THEREOF, AND METHOD OF MAKING SAME

Harold P. Brown, Akron, Ohio, assignor to The B. F. Goodrich Company, New York, N. Y., a corporation of New York No Drawing. Application November 24, 1950, Serial No. 197,497

8 Claims. (Cl. 260—80.7)

The present invention relates to the production of polymeric materials, particularly to the production of rubbery high molecular weight interpolymers from monomeric mixtures containing at least two essential ingredients, one a polymerizable monoisoolefin such as isobutylene and the other an alpha-beta unsaturated acid chloride such as acrylyl chloride and to the production of highly useful cured or elasticized compositions therefrom.

Polymers of isoolefins such as isobutylene are well known and are possessed of certain outstanding properties, for example, extremely low permeability to gases, good low temperature flexibility, resistance to oxidation, and good electrical properties. Since polyisobutylene and related materials are highly saturated it is difficult to cure or vulcanize them. The copolymers of isobutylene and isoprene, however, contain a small amount of unsaturation and are, therefore, vulcanizable by the action of sulfur. The introduction of unsaturation, even a small amount, makes the isobutylene isoprene copolymers and their sulfur vulcanizates susceptible to oxidation and makes them less flexible at low temperatures. Moreover, it is not possible, ordinarily, to produce sulfur vulcanizates from known isobutylene isoprene copolymers having desirably high tensile strength and modulus, especially in the unreinforced condition.

I have discovered that useful and unique polymers are produced by the polymerization at low temperatures in the presence of a Friedel-Crafts active metal halide catalyst of a monomeric mixture containing at least two essential ingredients, one an aliphatic monoisoolefin such as isobutylene and the other an alpha-beta unsaturated acid chloride such as acrylyl chloride copolymerizable therewith in such a medium. When the aliphatic monoisoolefin such as isobutylene is present in major proportion highly useful interpolymers are obtained having the desirable rubbery characteristics of the "butyl" synthetic rubbers, that is, remarkable inertness, impermeability to gases and the like, and in addition, having the remarkable ability when hydrolyzed, to be easily "cured" or elasticized by a condensation polymerization or salt formation reaction (which I hereinafter refer to as an "elasto-condensation") when mixed with a polyvalent metallic oxide and heated until an elastic polymeric metallo-carboxylate is formed.

It is greatly preferred to utilize as the olefinic monomer one or more of the aliphatic isoolefins containing but one olefinic double bond such as isobutylene, 2-methyl butene-1, 3-methyl butene-1, and others containing a total of not more than 8 carbon atoms. Compounds of this class produce generally higher molecular weight and more desirable polymers with the alpha-beta unsaturated acid chlorides, isobutylene being the most proficient isoolefin in this respect.

Any carboxylic acid chloride which is characterized by possessing one or more acid chloride

groups and one or more olefinic carbon-to-carbon double bonds, at least one of the latter being in the alpha-beta position with respect to an acid chloride group, is copolymerizable with the aliphatic monoisoolefins in the presence of a Friedel-Crafts catalyst. Illustrative alpha-beta unsaturated carboxylic acid chlorides of this class include the acid chlorides of monoolefinic monobasic acids such as acrylic acid (acrylyl chloride), beta-beta-dimethyl acrylic acid, methacrylic acid, alpha- and beta-chloro acrylic acids, crotonic acid, isocrotonic acid, hydrosorbic acid, cinnamic acid, and others; monoolefinic polybasic acids such as maleic acid, fumaric acid, beta-carboxy acrylic acid, and others; polyolefinic monobasic acids such as sorbic acid, alpha-methyl sorbic acid, alpha-chloro sorbic acid, beta-acryloxy acrylic acid, beta-vinyl acrylic acid, beta-(2-butenyl) acrylic acid (2,4-heptadiene-oic-1), 2,4,6-octatrienoic acid, alpha-beta-isopropylidene propionic acid having the structure

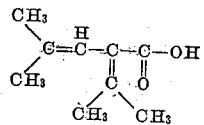

alpha-vinyl cinnamic acid, alpha-isopropenyl furfural acetic acid, alpha-isopropenyl cinnamenyl acrylic acid, and others; and polyolefinic polybasic acids such as 3-carboxy-pentadiene-(2,4)-oic-1, muconic acid, and others.

It is greatly preferred to utilize a carboxylic acid chloride selected from the class consisting of the acid chlorides of acrylic and alpha-substituted acrylic acids. Compounds within this preferred class are acrylyl chloride, the acid chloride of alpha-chloro acrylic acid, the acid chloride of methacrylic acid, the acid chloride of the ethacrylic acid, the acid chloride of alpha-vinyl acrylic acid and others. These acid chlorides polymerize most readily with the isoolefins such as isobutylene and produce polymers of greatest strength, elasticity and other rubbery properties, acryl chloride being the most proficient acid chloride in this respect.

The relative proportions of the essential monomers which are employed in the production of my new interpolymers may be varied widely depending on the type of polymer desired. For example, to produce predominantly rubbery interpolymers I have found it necessary to utilize monomeric mixtures containing a major proportion (i. e. 50 to 99% by wt.) of a monoisoolefin such as isobutylene and a minor proportion (1 to 50%) of an acid chloride. Predominantly resinous interpolymers are produced by the use of mixtures containing a major proportion of an acid chloride and a minor proportion of the monoisoolefin. It is preferred in the production of two-component polymers (or copolymers) to utilize monomeric mixtures containing from 70 to 99% by weight of the monoisoolefin and from 1 to 30% by weight of the acid chloride.

The properties of the interpolymers of this invention may be varied somewhat by the use of one or more other olefinic monomers in addition to the two essential monomers. For example, the use of minor proportions of an open-chain, aliphatic conjugated diene such as butadiene-1,3, isoprene, 2-chloro butadiene-1,3 and the like as a replacement-in-part for the isoolefin results in excellent rubbery interpolymers which are sulfur-vulcanizable. Similarly, minor proportions of other olefins such as styrene, acrylonitrile, vinylidene chloride and others may be utilized in the monomeric mixture. The proportions for the multi-component monomeric mixtures for the production of rubbery multi-component interpolymer range from 50 to 98% by weight of isoolefin, from 1 to 45% of an alpha-beta unsaturated acid chloride, and from 1 to 35% of one or more than one additional monomeric materials.

The olefinically-unsaturated monomers which may be additionally utilized in the production of rubbery multi-component polymers include, in particular, the aliphatic, acrylic and alicyclic polyolefins. Acyclic (or aliphatic) conjugated diolefins such as butadiene-1,3, isoprene, 2,3-dimethyl butadiene, piperylene, hexadiene-2,4, and the like may be utilized as may be alicyclic non-conjugated diolefins such as dimethallyl. In addition alicyclic diolefins both conjugated and non-conjugated are utilizable such as cyclopentadiene, dicyclopentadiene, 1-vinyl cyclohexene-3, 1-vinyl cyclohexene-1, substituted fulvenes of the general structure.

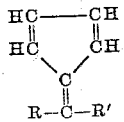

wherein R and R' are selected from the class consisting of hydrogen and hydrocarbon radicals, including specifically 6,6-dimethyl fulvene, 6-methyl fulvene, 6-methyl 6-vinyl fulvene, 6-methyl 6-cyclohexyl fulvene, 6-methyl 6-phenyl fulvene and many others. Acyclic triolefins such as myrcene as well as other polyolefins containing preferably a total of 4 to 10 carbon atoms may also be included in the multi-component monomeric mixtures.

In the preferred procedure for producing the interpolymers of this invention, the monomeric mixture is brought to the desired low temperature, which is usually below room temperature (i. e. 25° C.) and ordinarily between −10° C. and −160° C. and more preferably between −75 and −125° C., by any suitable means such as the addition of internal refrigerants such as solid carbon dioxide or by the addition of low-freezing inert diluents or solvents such as liquid methane, liquid ethane, liquid ethylene, liquid propane, liquid butane, liquid methyl or ethyl chlorides, methylene chloride, dichloro-difluoromethane, or carbon disulfide or by addition of any mixture of such materials or by immersing the reaction vessel in a bath of a suitable refrigerant such as liquid vinyl chloride, liquid ammonia, liquid methane, liquid ethane, liquid ethylene or the like.

After cooling to the desired reaction temperature the monomeric mixture is brought into contact with the Friedel-Crafts type of polymerization catalyst while maintaining the temperature within the desired range. The preferred catalyst consists of a Friedel-Crafts type active metal halide catalyst, particularly aluminum chloride, dissolved in an inert diluent which is liquid at reaction temperature. Boron trifluoride is another preferred catalyst which may be utilized in the form of vapors or in solution in appropriate solvent materials. Preferred solvents are methyl chloride, ethyl chloride, carbon disulfide and the like. Other Friedel-Crafts type catalysts, not necessarily in solution may also be used.

The catalyst is applied to the monomeric mixture in any desired manner, for example, by spraying a solution of the catalyst in the form of a fine mist onto the surface of the reaction mixture either continuously or in a single operation, and efficiently mixing the monomer and catalyst solutions. Still another technique of effecting intermingling of the monomer and catalyst solutions comprises conducting separate streams of monomer and catalyst solutions, by means of concentric pipes to the inlet of a centrifugal pump wherein quick and efficient intermingling of the solutions are effected.

When the monomer and catalyst solutions are efficiently intermingled at reaction temperatures, the polymerization reaction takes place very rapidly and smoothly to produce in most cases a slurry of fine polymer crumbs suspended in the inert diluent. Generally the reaction requires only a few minutes time to reach completion and need not be terminated before completion. The crumb-like polymer may be treated subsequently in several different ways depending on the type of polymer desired.

When it is desired to obtain the polymer as a true addition-type polymer containing interpolymerized or combined acid chloride

groups, the crumb-like polymer is separated from the liquid phase by screening and the solid coagulum extracted, for example, with anhydrous carbon tetrachloride, ethyl chloride, or other solvent for the catalyst. Alternatively, and preferably, the coagulum is dissolved in a solvent therefor such as benzene, chloroform, isopropyl chloride and the like in which the aluminum catalyst is insoluble, the undissolved catalyst is allowed to settle, the clear solution is decanted and the catalyst-free polymer is recovered by evaporation of the solvent. The polymer so-obtained is easily cured with polyvalent metal hydroxides to yield strong elastic polymeric materials, with polyethylene polyamines such as hexamethylene diamine, alkali-metal salts of dicarboxylic acids such as disodium oxalate, polyhydric alcohols such as ethylene glycol, and carboxylic acids (through anhydride formation). The cured products closely resemble cured specimens of the "butyl" type synthetic rubbers in their resistance to the diffusion of gases and in addition are much stronger and more rubber-like in nature.

Since the interpolymers containing free acid chloride groups are sensitive to water and give off hydrochloric acid on storage under ordinary conditions, it is much preferred to quench the catalyst and carry out the polymer separation steps in such a manner that the acid chloride groups of the original polymer will be converted by hydrolysis to combined (or "polymer bound") carboxyl (—COOH) groups. The latter result is preferably accomplished by the use of an aqueous quenching bath such as plain water or by the use of aqueous solutions of alcohol, ethylene glycol, monoethyl ether, acetone, or various other alcohols, ethers, esters, and ketones. If non-aqueous alcohols are utilized under proper conditions the acid chloride groups will be esterified with the production of olefin-ester polymers, some of which have very desirable properties. The preferred aqueous quenching step is followed, if necessary, by heating and working the wet polymer as in a steam-jacketed internal mixer in order to insure completion of the hydrolysis reaction and to dry the polymer. The product is a hydrolyzed polymer which, by reason of its combined (or "polymer bound") carboxyl groups, is capable of undergoing an elasto-condensation reaction with a polyvalent metal oxide and to be thereby converted to an elastic polymeric metallo-carboxylate having high strength in addition to many of the desirable properties of the conventional "butyl" synthetic rubbers.

An alternative procedure is to first effect a physical separation of the polymer from the liquid components of the reaction mixture and then to disperse the separated polymer in a large quantity of hydrolyzing agent. In batchwise reactions partial, if not complete, termination of reaction can be effected (when the catalyst is being added gradually over a period of time) by cessation of catalyst addition when the reaction has progressed to the desired point or by raising the temperature, or by any combination of the above-mentioned expedients followed, preferably by treatment with a catalyst quenching agent. After the reaction has proceeded to the desired point and the catalyst has been quenched, it is usually convenient to protect the polymer from oxidation or subsequent deterioration by adding an antioxidant thereto, a preferred procedure being to add a solution or dispersion of an antioxidant such as phenyl beta-naphthylamine or the like to the quenching bath or to subsequent polymer washing baths. The latter precaution is ordinarily necessary only in the production of polymers containing unsaturation since the co-polymers of isobutylene and an acid chloride are saturated in nature and are not susceptible to oxidation to the same degree as are the polymers containing diene-type unsaturation. The crumb-like polymer coagulum need only be screened subsequently to effect separation from the liquid content of the quenching and/or washing steps. The solid polymer may then be dried in crumb form and the dried crumbs compacted into a sheet by passing them through the rolls of a mill, or alternatively the wet crumbs may be passed through a corrugated mill roll to be compacted into a sheet and the wet sheet then dried. A preferred procedure is to place the wet crumbs of polymer in a steam-jacketed internal mixer wherein they may be masticated and heated to drive off the moisture and insure the completion of the hydrolysis reaction. However dried, the polymer is preferably sheeted out so as to be ready for use in the manner customary in the rubber industry.

Since the interpolymerization reaction is so rapid it will be readily appreciated that the entire process of polymerization, catalyst quenching, polymer hydrolysis and polymer isolation may be carried out in a batchwise manner or it may be made continuous, if desired, with recycling of recovered materials.

The following specific examples illustrate preferred embodiments of the invention in considerable detail. They illustrate the preparation of preferred interpolymers and demonstrate a few of their advantageous properties. The examples are not, however, to be considered as limiting the invention to the details therein set forth since numerous variations and modifications in procedure and materials, in accordance with the foregoing general disclosure, will be apparent to those skilled in the art.

*Example 1*

In this example, a monomer solution containing a mixture of 1.0 mole (56 parts/wt.) of isobutylene and 0.2 mole (18.0 parts/wt.) of acrylyl chloride is dissolved in ethyl chloride and mixed with a catalyst solution comprising aluminum chloride dissolved in ethyl chloride. The monomer solution is made by first dissolving the isobutylene in ethyl chloride and then cooling the resulting solution to about −100° C. by the addition of Dry Ice. The correct amount of acrylyl chloride is then added. The resulting solution should contain about three volumes of ethyl chloride to one volume of monomers.

A catalyst solution is prepared by first mixing 250 gms. of anhydrous ethyl chloride and 1.25 grams of anhydrous aluminum chloride at about 0° C., a temperature at which aluminum chloride is only sparingly soluble. The mixture is then allowed to warm to room temperature, at which temperature the aluminum chloride dissolves in the ethyl chloride. The catalyst solution is then cooled to about −100° C. without crystallization or separation of aluminum chloride.

The catalyst and monomer solutions are then mixed by adding a small stream of catalyst solution below the surface of the monomer solution while vigorously agitating the reaction mixture to prevent the formation of large clumps of polymer. Interpolymerization of the monomers is substantially complete during the 10 minutes required for catalyst addition forming a solid rubbery interpolymer in the form of white, fluffy, slightly sticky mass. When all the catalyst solution is added, the agitation of the contents of the reaction vessel is continued for a short time to allow completion of the reaction. The reaction is allowed to warm up above 0° C. before 50 ml. of water are added thereto as a catalyst quenching agent. The resulting mixture is stirred for several minutes before it is poured into 300 ml. of water containing 0.15 gm. of phenyl beta-naphthylamine. The crumb-like polymer is then separated from the liquid phase by screening and the crumb-like coagulum washed with clear water until the wash water is chloride free (3 washes). The washed coagulum is then placed in a Brabender internal mixer and masticated at a temperature of 70 to 75° C. under vacuum until a dry, slightly sticky mass is obtained. The product is found to contain 4.8% acid (as acrylic acid) and is found to possess a molecular weight of 280,000. The mass is then transferred directly to a two roll rubber mill for incorporation of compounding materials.

The polymer obtained above is placed on a two-roll rubber mill and compounding ingredients are incorporated according to the following recipe:

RECIPE A

| Material: | Parts/wt. |
|---|---|
| Polymer | 100 |
| Zinc oxide | 5 |
| Stearic acid | 3 |
| Easy processing channel black | 50 |

The composition is press molded for 60 minutes at 325° F. to produce a strong elastic polymeric metallo-carboxylate having a tensile strength of 1850 lbs./sq. in., an elongation of 595%, and a modulus at 300% elongation of 1,000 lbs./sq. in. By contrast, a conventional isobutylene isoprene copolymer known as "GR-I," when compounded in the following recipe:

RECIPE B

| Material: | Parts/wt. |
|---|---|
| Polymer | 100 |
| Zinc oxide | 5 |
| Stearic acid | 3 |
| Easy processing channel black | 50 |
| Captax¹ | 1.0 |
| Tuads² | 0.5 |
| Sulfur | 2.0 |

¹ 2-mercaptobenzothiazole
² A mixture of tetraalkyl thiuram disulfides exhibits a tensile strength of 2650 lbs./sq. in. at 545% elongation. Thus it is possible to convert the hydrolyzed isobutylene acrylyl chloride polymer of this example to a polymeric metallo-carboxylate having physical properties approaching those of the sulfur-cured conventional isobutylene isoprene copolymer. However, since the polymer metallo-carboxylate contains no residual unsaturation (the original carboxyl-containing polymer was free of unsaturation) it has the additional advantage over the isobutylene isoprene copolymer of being more resistant towards oxidation, chemicals and other deleterious influences.

*Example 2*

The unhydrolyzed isobutylene acrylyl chloride copolymer of Example 1 (i. e. containing $$-\overset{O}{\underset{\|}{C}}-Cl$$

groups) is isolated as such by taking a portion of the original reaction mixture and separating the fluffy crumb-like coagulum, dissolving it in anhydrous benzene, and then allowing the resulting solution to stand until the insoluble aluminum chloride catalyst separates out. The polymer is recovered by evaporation of the benzene. The resulting solid polymer is mixed with 10 parts by weight of zinc hydroxide per hundred parts by weight of polymer (phr.) and heated for 20 minutes at 300° F. to obtain an elastic cross-linked or "cured" composition having the properties of a polymeric metallo-carboxylate.

*Example 3*

Multi-component interpolymers are made by a procedure similar to that of Example 1 from (1) a mixture of 95.2 parts by weight of isobutylene, 2.4 parts by weight of isoprene, 1.4 parts of 6,6-dimethyl fulvene, and 1.5 parts by weight of acrylyl chloride and (2) a mixture of 86 parts by weight of isobutylene, 10.3 parts of isoprene, and 3.7 parts of acrylyl chloride. The tetrapolymer obtained from mixture (1) contains 1.0% by weight of acid (as acrylic acid) or 0.014 equivalents by weight of carboxyl (—COOH) per hundred parts by weight of rubbery polymer (hereinafter abbreviated ephr.) and has a molecular weight of about 140,000. The tripolymer resulting from mixture (2) contains 0.06 ephr. of carboxyl (—COOH) and has a molecular weight of about 100,000.

When the tetrapolymer of this example is compounded in Recipe A of Example 1 and press molded for 40 minutes at 325° F. a strong elastic polymeric metallo-carboxylate is obtained having a tensile strength of 1420 lbs./sq. in., an elongation of 580%, and a modulus at 300% elongation of 690 lbs./sq. in. In the sulfur-accelerator Recipe B of Example 1 the tetrapolymer produces a composition after 20 minutes cure at 325° F. having a tensile strength of 1710 lbs./sq. in., an elongation of 500% and a 300% modulus of 1020 lbs./sq. in. Thus the tetrapolymer is cured with equal facility with either a metallic oxide recipe or a sulfur-accelerator combination. The tripolymer of Example 3 is similarly cured with either zinc oxide or the sulfur-accelerator combination to produce a strongly elastic, polymeric metallo-carboxylate.

*Example 4*

A mixture of 1.0 mole of isobutylene and 0.1 mole of the acid chloride of beta-beta-dimethyl acrylic acid (beta-beta-dimethyl acrylyl chloride) is dissolved in three volumes of ethyl chloride and polymerized according to the procedure of Example 1. The product is a copolymer containing 0.3% acid (as beta-beta-dimethyl acrylic acid) or 0.003 ephr. of carboxyl. When the polymer is admixed with 5 phr. of zinc oxide and heated 30 minutes at 300° F. an elastic polymeric metallo-carboxylate is obtained.

*Example 5*

In a manner similar to that of Example 3 a mixture of 1.0 mole of isobutylene and 0.05 mole of the acid chloride of beta-vinyl acrylic acid (beta-vinyl acrylyl chloride) yields a polymer containing 1.5% by weight of vinyl acrylic acid and having a molecular weight of 730,000. When the polymer is admixed with 5 phr. of zinc oxide and heated for 30 minutes at 300° F. a strongly elastic polymeric metallo-carboxylate is obtained.

*Example 6*

Mixtures containing from 50 to 98% styrene, from 5 to 40% of isobutylene, and from 2 to 50% acrylyl chloride polymerize according to the procedure of the foregoing examples to produce hard, resinous, thermoplastic polymers resembling polystyrene in clarity and strength. Addition of theoretical quantities of a metallic oxide such as zinc oxide and heating in a press mold greatly reduces the thermoplasticity and brittleness of the polymers without appreciably affecting their clarity, transparency and color.

In a similar fashion, mixtures containing from 50 to 98% by weight of isobutylene, from 1.0 to 45% by weight of an acid chloride and from 1 to 35% by weight of a monoolefin such as styrene, o-chlorostyrene, chloroethyl vinyl ether, and others produce rubbery interpolymers useful for many of the uses in which natural and synthetic rubbers are conventionally utilized. Their ability to elasto-condense with a polyvalent metallic oxide with the attainment of a high tensile strength without reinforcing agents makes possible the production of transparent or pastel-colored sheets, films, plates, and coated or extruded articles.

When desired for elasto-condensation with a polyvalent metallic oxide the hydrolyzed interpolymers should contain specified amounts of combined carboxyl (—COOH). Generally, interpolymers containing from 0.001 to 0.350 ephr., that is, chemical equivalents of carboxyl (—COOH) per 100 parts of interpolymer (corresponding to 0.07 to 25.2% by weight of combined acrylic acid) are predominantly plastic in nature and when elasto-condensed produce polymeric metallo-carboxylates which are predominantly elastic in nature. Interpolymers containing from 0.02 to 0.20 chemical equivalents of carboxyl are preferred for the production of polymeric metallo-carboxylates having the best balance of tensile strength, elongation, and low temperature flexibility.

As stated hereinbefore, the proportion of acid chloride utilized in forming the interpolymers of this invention may be varied widely depending on the nature of polymer desired. Examples 1 and 2 described hereinabove are directed to the production of a high molecular weight solid rubbery interpolymer of isobutylene, which interpolymer contains a major proportion of combined isobutylene and a minor proportion of acid chloride, and is characterized by possessing a high molecular weight (generally above 100,000, preferably above 200,000 as determined by the solution viscosity method of Staudinger), by possessing very low unsaturation and by being capable of an elasto-condensation with a polyvalent metallic oxide (i. e. containing from 0.001 to 0.35 chemical equivalents of combined (—COOH) or

groups per 100 parts of polymer) to a strong elastic condition. Such interpolymers are useful as synthetic rubbers in the same manner as "butyl" rubber, being of particular value for inner tubes. Example 3 is directed to the production of high molecular weight multi-component interpolymers from monomeric mixtures containing in addition to the two essential monomers, one or more polyolefinic monomers such as isoprene or 6,6-dimethyl fulvene. Examples 4 and 5 demonstrate the utility of acid chlorides other than acrylyl chloride while Example 6 is directed to the production of high molecular weight resinous thermoplastic interpolymers useful in the same manner as other thermoplastic resins, from a major proportion of another olefin, styrene, and minor proportions of each of isobutylene and an alpha-beta unsaturated carboxylic acid chloride.

The foregoing examples have disclosed the use of ethyl chloride as a diluent for the monomer and as the solvent in the catalyst solution. The alpha-beta unsaturated carboxylic acid chloride interpolymers of this invention may be made, however, with variations in the diluent used or may be made without diluent. Ethyl chloride is the preferred diluent because the resultant slurry of polymer is more easily handled in the recovery operations and its use appears to favor the formation of polymers having slightly higher molecular weight. Methyl chloride, however, may be substituted for ethyl chloride without a significant difference in the polymerization and it is the preferred solvent when operating at extremely low reaction temperatures of −125 to −150° C. Other diluents such as liquid methane, liquid ethane, liquid propane, liquid ethylene, and others may be substituted for the ethyl chloride shown in the examples, either in whole or in part with good results though the rubbery interpolymers may not be as easily separated from a predominantly hydrocarbon reaction medium as from a reaction medium consisting of the chloro-hydrocarbons.

Anhydrous aluminum chloride used in the examples above is the preferred Friedel-Crafts catalyst. The amount of this material or other Friedel-Crafts catalyst is not critical and the yield and molecular weight of the resultant polymer appears to be large independent of the amount and concentration of catalyst. The only real limitation on the amount and concentration of catalyst is a mechanical difficulty encountered when using a concentrated catalyst solution whereby it is difficult to efficiently distribute such catalyst solution before rapid polymerization occurs with the formation of unwieldy clumps of polymer and consequent localized overheating. It has been found that 1 part by weight of aluminum chloride dissolved in sufficient ethyl or methyl chloride to provide a solution containing from 0.01 to 2% by weight of aluminum chloride will effect the polymerization of from 100 to 600 parts by weight of polymer without an appreciable induction period and with substantially complete conversion of the monomeric mixture to high molecular weight polymer. When specially purified monomers are utilized in a glass lined reaction vessel, less catalyst in the form of more dilute solutions may be used. The useful catalyst concentration range is from 0.001 to 3% by weight of aluminum chloride based on the weight of monomers in sufficient ethyl or methyl chloride to yield solutions of about 0.01 to 10% by weight.

Boron trifluoride in amounts 0.10 to 3.0% based on the monomers in the form of solutions in ethyl or methyl chloride containing from 0.1 to 3.0% active catalyst will also successfully accomplish polymerization of monomeric mixtures containing isobutylene and the acid chlorides. Other Friedel-Crafts type catalysts which may be utilized include antimony chloride, iron chloride, tin chloride, and zinc chloride as well as the halides of aluminum, titanium, uranium, and zirconium, and complexes of any of these with inorganic polar compounds, such as sodium chloride or other alkali or alkaline earth metal halides, hydrogen halides, and organic polar compounds such as the various nitro compounds, organic halides, ethers, esters, ketones and sulfones.

The conversion of the hydrolyzed interpolymers of this invention to a strong elastic condition by an elasto-condensation also has been described in the foregoing examples with specific reference to zinc oxide as the curing agent. Other polyvalent metallic oxides may be utilized with substantially equivalent results including those of zinc, magnesium, cadmium, calcium, titanium, aluminum, barium, strontium, copper (ic), cobalt(ic), tin, iron, lead and others. Specifically, zinc oxide, calcium oxide, cadmium oxide (CdO), magnesium oxide, dibutyl tin oxide (C₄H₉O)₂Sn, lead oxide (PbO and Pb₃O₄), barium oxide (BaO), cobalt oxide (Co₂O₃), tin oxide (SnO), strontium oxide (SrO), and others produce superior results and are preferred. In addition, various polyvalent metallic hydroxides, which in reality are hydrated metallic oxides and readily split off water upon being heated or upon reaction with polymeric carboxyl groups, such as calcium hydroxide, cadmium hydroxide [Cd(OH)₂], zinc hydroxide, barium hydroxide, and others produce excellent results and also are preferred.

The amount of polyvalent metallic oxide curing or elasto-condensing agent may be varied widely. However, for good results sufficient metallic oxide should be used as is required to react with at least ½ the carboxyl groups of the polymer. Better results are obtained when at least one equivalent weight of oxide is utilized. Since excess metallic oxide functions as a filler only, it is preferred to utilize twice or more the amount of polyvalent metallic oxide theoretically required to react with the carboxyl groups of the polymer.

The intermixing of the plastic, rubbery carboxyl-containing interpolymer with the polyvalent metal oxide is performed in any conventional manner such as by mill-mixing, mixing in a Banbury mixer or other internal mixer, or by mixing an aqueous dispersion of the metal oxide with a latex or artificially-prepared aqueous dispersion of the carboxyl-containing polymer, in which case films and shaped articles can be prepared from the resulting mixed dispersion by the coagulant dip method or other latex casting methods. The mixing of the metal oxide with the solid carboxyl-containing polymer should be performed at moderate working temperatures, that is, below mill roll temperatures of about 275° F., more preferably below 200° F., in order to avoid "scorching" of the stock. The mastication of the mixture should be continued until the resulting mixture is homogeneous and the metal oxide is well dispersed in the rubber. Softeners, plasticizers, milling aids, age-resistors, carbon black, pigments and fillers, and other substances may be incorporated into the rubber, preferably before addition of the metal oxide. In any case the resulting mixture should be plastic, workable and homogeneous.

The conversion of the hydrolyzed solid polymers to an essentially elastic condition is brought about by heating the plastic, oxide-containing composition preferably in a press mold under pressure, at temperatures of from 125 to 400° F., more preferably from 150 to 350° F. The heating step is usually required to shorten the curing cycle, increase the mobility of the reacting ingredients and insure a sufficient degree of elasto-condensation. The time of heating will vary somewhat, depending on the carboxyl content of the rubber and on the kind and amount of polyvalent metallic oxide employed. Generally, however, a heating or molding cycle of from five to ten minutes to as much as two hours will be found sufficient.

Thus the interpolymerization of an olefin with an alpsa-beta unsaturated carboxylic acid chloride produces polymers, regardless of the proportions of acid chloride employed, which are themselves useful or which may be hydrolyzed, esterified or otherwise converted into other useful polymers. Consequently, this invention provides several new classes of polymeric materials and a method of producing them. While the invention has been described in considerable detail with respect to the manner of treatment of these various polymeric materials, it is to be understood that the invention is not limited solely thereto, and that various equivalent polymeric materials and other equivalent methods of treating them, which will be obvious to those skilled in the art, are within the spirit and scope of the invention as defined by the appended claims.

I claim:
1. The process which comprises preparing a mixture of (1) a plastic, rubbery material containing from 0.001 to 0.350 chemical equivalents by weight of combined —COOH per 100 parts of rubbery material prepared by the polymerization at a temperature of from —10 to —160° C. in the presence of a Friedel-Crafts catalyst of a monomeric mixture comprising from 50 to 99% by weight of an aliphatic monoisoolefin and 1 to 50% by weight of an alpha-beta unsaturated carboxylic acid chloride and then hydrolyzing the resultant interpolymer to convert the acid chloride groups therein to —COOH groups, and (2) an amount of a polyvalent metal oxide at least equivalent chemically to one-half said combined —COOH of said rubbery material and forming a homogeneous plastic mixture thereof, and finally heating the said plastic mixture at a temperature of from 125 to 400° F. to effect its conversion to an elastic polymeric metallo-carboxylate.

2. The process which comprises preparing a mixture of (1) a plastic, rubbery material having a molecular weight above 100,000 and containing from 0.001 to 0.350 chemical equivalents by weight of combined —COOH per 100 parts of rubbery material prepared by the polymerization at a temperature of from —75 to —125° C. in the presence of a Friedel-Crafts catalyst of a monomeric mixture comprising from 50 to 99% by weight of isobutylene and 1 to 50% by weight of a compound selected from the class consisting of the acid chlorides of acrylic acid and alpha-substituted acrylic acids and then hydrolyzing the resultant interpolymer to convert the acid chloride groups therein to —COOH groups, and (2) an amount of a polyvalent metal oxide at least equivalent chemically to one-half said combined —COOH of said rubbery material and forming a homogeneous plastic mixture thereof, and finally heating the said plastic mixture at a temperature of from 125 to 400° F. to effect its conversion to an elastic polymeric metallo-carboxylate.

3. The process which comprises preparing a mixture of (1) a plastic, rubbery material containing from 0.001 to 0.350 chemical equivalents by weight of combined —COOH per 100 parts of rubbery material and having a molecular weight above 200,000 prepared by the polymerization at temperatures of —75 to —125° C. in the presence of a Friedel-Crafts catalyst of a monomeric mixture comprising from 50 to 98% by weight of isobutylene, from 1 to 45% by weight of acrylyl chloride and from 1 to 35% by weight of an open-chain, aliphatic conjugated diene and then hydrolyzing the resultant interpolymer to convert the acid chloride groups therein to —COOH groups, and (2) an amount of a polyvalent metal oxide at least equivalent chemically to twice said combined —COOH of said rubbery material and forming a homogeneous plastic mixture thereof, and finally heating the said plastic mixture at a temperature of from 125 to 400° F. to effect its conversion to an elastic polymeric metallo-carboxylate.

4. The process which comprises preparing a mixture of (1) a plastic, rubbery material containing from 0.02 to 0.20 chemical equivalents by weight of combined —COOH per 100 parts of rubbery material and having a molecular weight above 200,000 prepared by the polymerization at a temperature of from —75 to —125° C. in the presence of a Friedel-Crafts catalyst of a monomeric mixture comprising from 50 to 98% isobutylene, from 1 to 45% by weight of acrylyl chloride, and from 1 to 35% by weight of isoprene and then treating the resulting interpolymer with water to convert the acid chloride groups therein to —COOH groups, and (2) an amount of a polyvalent metal oxide at least equivalent chemically to twice said combined —COOH of said rubbery material and forming a homogeneous plastic mixture thereof, and finally heating the said plastic mixture at a temperature of from 125 to 400° F. to effect its conversion to an elastic polymeric metallo-carboxylate.

5. The method which comprises preparing a mixture of (1) a plastic, rubbery material containing from 0.02 to 0.20 chemical equivalents by weight of combined —COOH per 100 parts of rubbery material and having a molecular weight in excess of 200,000 prepared by the polymerization at a temperature of from —75 to —125° C. in the presence of a Friedel-Crafts catalyst of a monomeric mixture consisting of from 70 to 99% by weight of isobutylene and 1 to 30% by weight of acrylyl chloride and then treating the resulting interpolymer with water to convert the acid chloride groups to —COOH groups, and (2) an amount of polyvalent metal oxide at least equivalent chemically to twice the combined —COOH of said rubbery material and forming a homogeneous plastic mixture thereof, and finally heating the said plastic mixture at a temperature of 125 to 400° F. to effect its conversion to an elastic polymeric metallo-carboxylate.

6. An elastic polymeric metallo-carboxylate prepared by the method of claim 5.

7. The method which comprises preparing a mixture of (1) a plastic, rubbery material containing from 0.02 to 0.20 chemical equivalents by weight of combined —COOH per 100 parts of rubbery material and having a molecular weight in excess of 200,000 prepared by the polymerization at a temperature of from —75 to —125° C. in the presence of a Friedel-Crafts catalyst of a monomeric mixture consisting of from 70 to 90% by weight of isobutylene and 1 to 30% by weight of acrylyl chloride and then treating the resulting interpolymer with water to convert the acid chloride groups to —COOH groups and (2) an amount of zinc oxide at least equivalent chemically to twice the combined —COOH of said rubbery material and forming a homogeneous plastic mixture thereof, and finally heating the said plastic mixture at a temperature of 125 to 400° F. to effect its conversion to an elastic polymeric metallo-carboxylate.

8. An elastic polymeric zinc-carboxylate prepared by the method of claim 7.

HAROLD P. BROWN.

References Cited in the file of this patent

UNITED STATES PATENTS

| Number | Name | Date |
|---|---|---|
| 1,984,417 | Mark et al. | Dec. 18, 1934 |
| 2,234,204 | Starkweather et al. | Mar. 11, 1941 |
| 2,391,162 | Heubner et al. | Dec. 18, 1945 |
| 2,395,506 | Sauser | Feb. 26, 1946 |
| 2,405,950 | Hanford | Aug. 20, 1946 |
| 2,416,060 | McAlevy et al. | Feb. 18, 1947 |